United States Patent
Hori

(10) Patent No.: US 10,522,829 B2
(45) Date of Patent: Dec. 31, 2019

(54) METHOD FOR MANUFACTURING POSITIVE ELECTRODE FOR LITHIUM ION SECONDARY BATTERY AND POSITIVE ELECTRODE FOR LITHIUM ION SECONDARY BATTERY

(71) Applicant: TOYOTA JIDOSHA KABUSHIKI KAISHA, Toyota-shi, Aichi-ken (JP)

(72) Inventor: Yukiko Hori, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 204 days.

(21) Appl. No.: 15/847,354

(22) Filed: Dec. 19, 2017

(65) Prior Publication Data

US 2018/0183053 A1 Jun. 28, 2018

(30) Foreign Application Priority Data

Dec. 27, 2016 (JP) ................. 2016-252705

(51) Int. Cl.
*H01M 4/505* (2010.01)
*H01M 4/48* (2010.01)
(Continued)

(52) U.S. Cl.
CPC ......... *H01M 4/505* (2013.01); *H01M 4/0404* (2013.01); *H01M 4/1391* (2013.01);
(Continued)

(58) Field of Classification Search
CPC ........... H01M 4/1391; H01M 4/13915; H01M 4/366; H01M 4/505
(Continued)

(56) References Cited

U.S. PATENT DOCUMENTS 8,900,756 B1 * 12/2014 Atwater ............. C01G 45/1242
423/599
2013/0164624 A1 6/2013 Sheem et al.
(Continued)

FOREIGN PATENT DOCUMENTS

JP 2014075177 A 4/2014
JP 2015-138611 A 7/2015
(Continued)

*Primary Examiner* — Basia A Ridley
*Assistant Examiner* — James M Erwin
(74) *Attorney, Agent, or Firm* — Sughrue Mion, PLLC

(57) ABSTRACT

A method for manufacturing a positive electrode for a lithium ion secondary battery includes preparing lithium manganese complex oxide particles, preparing coated particles by forming a coating including a $Li^+$-conductive oxide on a surface of each lithium manganese complex oxide particle, introducing fluorine into at least a part of the coated particles, preparing a fluid composition by mixing the coated particles at least a part of which fluorine is introduced into, a conductive material, an aqueous binder, and an aqueous solvent, forming a positive electrode mixture layer by disposing the fluid composition on a surface of a collector, and drying the positive electrode mixture layer. The thickness of the coating is 5 nm or more and 10 nm or less. Fluorine is introduced such that the ratio of fluorine to manganese in terms of the number of atoms in the coated particles reaches 1.95 or more and 3.1 or less.

8 Claims, 4 Drawing Sheets

(51) Int. Cl.
*H01M 10/0525* (2010.01)
*H01M 4/38* (2006.01)
*H01M 4/04* (2006.01)
*H01M 4/13915* (2010.01)
*H01M 4/36* (2006.01)
*H01M 4/1391* (2010.01)
*H01M 4/02* (2006.01)

(52) U.S. Cl.
CPC ....... *H01M 4/13915* (2013.01); *H01M 4/366* (2013.01); *H01M 4/38* (2013.01); *H01M 4/48* (2013.01); *H01M 10/0525* (2013.01); *H01M 2004/028* (2013.01)

(58) Field of Classification Search
USPC .................................................. 429/231.95
See application file for complete search history.

(56) References Cited

U.S. PATENT DOCUMENTS

| | | | |
|---|---|---|---|
| 2014/0242463 A1 | 8/2014 | Song et al. | |
| 2016/0211504 A1 | 7/2016 | Uezono et al. | |
| 2016/0329563 A1* | 11/2016 | Oh | H01M 4/505 |

FOREIGN PATENT DOCUMENTS

| | | | |
|---|---|---|---|
| JP | 2016054134 A | 4/2016 | |
| JP | 2016134269 A | 7/2016 | |
| KR | 1020130033154 A | 4/2013 | |
| KR | 1020130073461 A | 7/2013 | |

\* cited by examiner

METHOD FOR MANUFACTURING POSITIVE ELECTRODE FOR LITHIUM ION SECONDARY BATTERY AND POSITIVE ELECTRODE FOR LITHIUM ION SECONDARY BATTERY

INCORPORATION BY REFERENCE

The disclosure of Japanese Patent Application No. 2016-252705 filed on Dec. 27, 2016 including the specification, drawings and abstract is incorporated herein by reference in its entirety.

BACKGROUND

1. Technical Field

The present disclosure relates to a method for manufacturing a positive electrode for a lithium ion secondary battery and a positive electrode for a lithium ion secondary battery.

2. Description of Related Art

Japanese Unexamined Patent Application Publication No. 2015-138611 (JP2015-138611 A) discloses that a positive electrode is manufactured by preparing a paste (also referred to as "slurry") by dispersing lithium manganese complex oxide particles in water and applying and drying the paste on the surface of a collector.

SUMMARY

As positive electrode active material particles for lithium ion secondary batteries, lithium manganese complex oxide particles (hereinafter, also referred to as "LiMn complex oxide particles") are known. Among various kinds of LiMn complex oxide particles, there are particles considered to be promising as a next-generation 5V-class positive electrode material.

In the related art, positive electrodes for lithium ion secondary batteries (hereinafter, in some cases, abbreviated as "positive electrodes") are manufactured by applying and drying a paste on the surface of a collector. The paste is prepared by mixing positive electrode active material particles, a binder, and the like in a large amount of a solvent.

As dispersion media of pastes, organic solvents or aqueous solvents are used. From the viewpoint of environmental load, manufacturing costs, and the like, aqueous solvents are desirably used. However, when LiMn complex oxide particles and water come into contact with each other, an exchange reaction between lithium ions ($Li^+$) and protons ($H^+$) is caused on the surfaces of the LiMn complex oxide particles, and $H^+$ is adsorbed onto the surfaces of the LiMn complex oxide particles.

During the drying of the paste, the LiMn complex oxide particles are exposed to a high temperature. As a result, $H^+$ adsorbed onto the surfaces of the LiMn complex oxide particles pulls oxygen (O) from the surfaces of the LiMn complex oxide particles and desorbs in an $H_2O$ form. The imbalance of electric charges caused by the desorption of oxygen is compensated for by a change in the valence of Mn. That is, on the surfaces of the LiMn complex oxide particles, the valence of Mn decreases from 4+ to 3+. As a result, reaction resistance further increases.

The disclosure relates to a suppression of an increase in reaction resistance during the manufacturing of positive electrodes including lithium manganese complex oxide particles.

Hereinafter, the technical configuration and action effects of the disclosure will be described. However, some of the action mechanism of the disclosure is based on assumptions. The scope of the disclosure is not supposed to be limited by whether the action mechanism is correct or incorrect.

A first aspect of the disclosure relates to a method for manufacturing a positive electrode for a lithium ion secondary battery. The method includes preparing lithium manganese complex oxide particles, preparing coated particles by forming a coating including a lithium ion-conductive oxide on a surface of each of the lithium manganese complex oxide particles, introducing fluorine into at least a part of the coated particles, preparing a fluid composition by mixing the coated particles at least a part of which fluorine is introduced into, a conductive material, an aqueous binder, and an aqueous solvent, forming a positive electrode mixture layer by disposing the fluid composition on a surface of a collector, and drying the positive electrode mixture layer. The coating is formed so as to have a thickness of 5 nm or more and 10 nm or less. Fluorine is introduced into at least a part of the coated particles such that a ratio of the number of fluorine atoms to the number of manganese atoms in the coated particles reaches 1.95 or more and 3.1 or less.

According to the first aspect of the disclosure, the LiMn complex oxide particles are coated with the coating. Additionally, fluorine (chemical symbol: F) is introduced into at least a part of the LiMn complex oxide particles and the coatings.

The coatings physically suppress contact between water and the LiMn complex oxide particles. Furthermore, the fluorine-introduced portions become hydrophobic. Due to the combination of the above-described actions, on the surfaces of the LiMn complex oxide particles, the exchange reaction between $Li^+$ and $H^+$ is significantly suppressed. Therefore, it is considered that a change in the valence of Mn, that is, an increase in reaction resistance is further suppressed.

Here, the coating needs to be configured of a lithium ion ($Li^+$)-conductive oxide. When the coating is configured of a lithium ion ($Li^+$)-conductive oxide, the coating is capable of being $Li^+$-conductive. In a case in which the coating is not $Li^+$-conductive, there is a possibility that reaction resistance can, conversely, increase. This is considered to be because the diffusion of $Li^+$ is impaired by coatings that are not $Li^+$-conductive.

The coating needs to be formed so as to have a thickness of 5 nm or more and 10 nm or less. In a case in which the thickness of the coating is less than 5 nm, the coating does not become dense, and there is a possibility that the contact between water and the LiMn complex oxide particles cannot be sufficiently suppressed. In a case in which the thickness of the coating is more than 10 nm, there is a possibility that reaction resistance can, conversely, increase. This is considered to be because the diffusion of $Li^+$ is impaired by thick coatings.

The ratio (hereinafter, also referred to as "F/Mn ratio") of the number of F atoms to the number of Mn atoms needs to be 1.95 or more and 3.1 or less. In a case in which the F/Mn ratio is less than 1.95, there is a possibility that sufficient hydrophobicity cannot be developed. In a case in which the F/Mn ratio is more than 3.1, there is a possibility that reaction resistance can, conversely, increase. This is considered to be because resistant components, for example, LiF, are generated by the excess introduction of fluorine.

In the method according to the first aspect of the disclosure, the lithium ion-conductive oxide may be at least one oxide selected from the group consisting of a zirconium oxide, a niobium oxide, and a titanium oxide. According to the first aspect of the disclosure, the zirconium oxide, the niobium oxide, and the titanium oxide are preferred as the $Li^+$-conductive oxide of the disclosure due to the extremely high $Li^+$-conductivity.

In the method according to the first aspect of the disclosure, a solid content fraction of the fluid composition may be 70% by mass or more and less than 100% by mass. The "solid content" refers to, among components included in the fluid composition, all of the components except the solvent. The "solid content fraction" refers to the mass fraction of the solid content in the fluid composition. The solid content fraction increasing indicates the mass fraction of an aqueous solvent decreasing, that is, the amount of the aqueous solution decreasing. According to the first aspect of the disclosure, it is considered that, when the solid content fraction of the fluid composition is 70% by mass or more, the contact frequency between water and the LiMn complex oxide particles is relatively low, and thus it is more difficult for the exchange reaction between $Li^+$ and $H^+$ to be caused. On the other hand, the composition in which the solid content fraction of the fluid composition is 100% by mass (that is, not containing any aqueous solution) is poorly fluid, and thus it is difficult to form the positive electrode mixture layer.

In the method according to the first aspect of the disclosure, the fluid composition may be wet granules. The "granules" refer to aggregates of particles obtained by granulation operations. The granules are also referred to as "granulated bodies". The "wet granules" refer to assemblies of granules in a wet state (that is, granules including a solvent). The wet granules need a small amount of a solvent and are capable of being fluid enough to form the positive electrode mixture layer. According to the first aspect of the disclosure, it is considered that, when the fluid composition is wet granules, the contact frequency between water and the LiMn complex oxide particles is decreased. In addition, since the amount of the solvent is small, for example, reduction of the drying costs, shortening of the drying time, and the like are also expected.

In the method according to the first aspect of the disclosure, the forming of the positive electrode mixture layer may include formation of the wet granules in a lamellar shape by roll shaping and disposition of the wet granules shaped in a lamellar shape by roll transfer on the surface of the collector. According to the first aspect of the disclosure, manufacturing facilities can become simple and compact by the employment of roll shaping and roll transfer.

A second aspect of the disclosure relates to a positive electrode for a lithium ion secondary battery including a collector and a positive electrode mixture layer. The positive electrode mixture layer is disposed on a surface of the collector. The positive electrode mixture layer includes coated particles, a conductive material, and an aqueous binder. The coated particle includes a lithium manganese complex oxide particle and a coating. The coating coats a surface of the lithium manganese complex oxide particle. The coating includes a lithium ion-conductive oxide. A thickness of the coating is 5 nm or more and 10 nm or less. The coated particle further includes fluorine. A ratio of the number of fluorine atoms to the number of manganese atoms in the coated particles is 1.95 or more and 3.1 or less.

According to the second aspect of the disclosure, the positive electrode mixture layer includes an aqueous binder. That is, the positive electrode mixture layer is a layer formed of a fluid composition including an aqueous solvent being disposed on the surface of the collector. The positive electrode mixture layer includes LiMn complex oxide particles. The LiMn complex oxide particle is coated with a $Li^+$-conductive oxide (coating). Furthermore, fluorine is introduced into at least one of the LiMn complex oxide particle and the coating. Therefore, it is considered that the reaction resistance of the positive electrode of the disclosure can be lower regardless of the use of the aqueous solvent in manufacturing processes.

In the positive electrode according to the second aspect of the disclosure, the lithium ion-conductive oxide may be at least one oxide selected from the group consisting of a zirconium oxide, a niobium oxide, and a titanium oxide. The zirconium oxide, the niobium oxide, and the titanium oxide are extremely highly $Li^+$-conductive. According to the second aspect of the disclosure, the lithium ion-conductive oxide is at least one oxide selected from the group consisting of a zirconium oxide, a niobium oxide, and a titanium oxide and is thus expected to have lower reaction resistance than the positive electrode.

In the positive electrode according to the second aspect of the disclosure, the positive electrode mixture layer may include granules. The granules may include the coated particles, the conductive material, and the aqueous binder. That is, the positive electrode may be a positive electrode manufactured from wet granules. According to the second aspect of the disclosure, the positive electrode is expected to have lower reaction resistance. This is because, in manufacturing processes, the contact between the LiMn complex oxide particles and water is sufficiently suppressed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the disclosure (hereinafter, also referred to as "the embodiment") will be described. However, the following description does not limit the scope of the disclosure.

Method for Manufacturing Positive Electrode for Lithium Ion Secondary Battery

Figure 1:
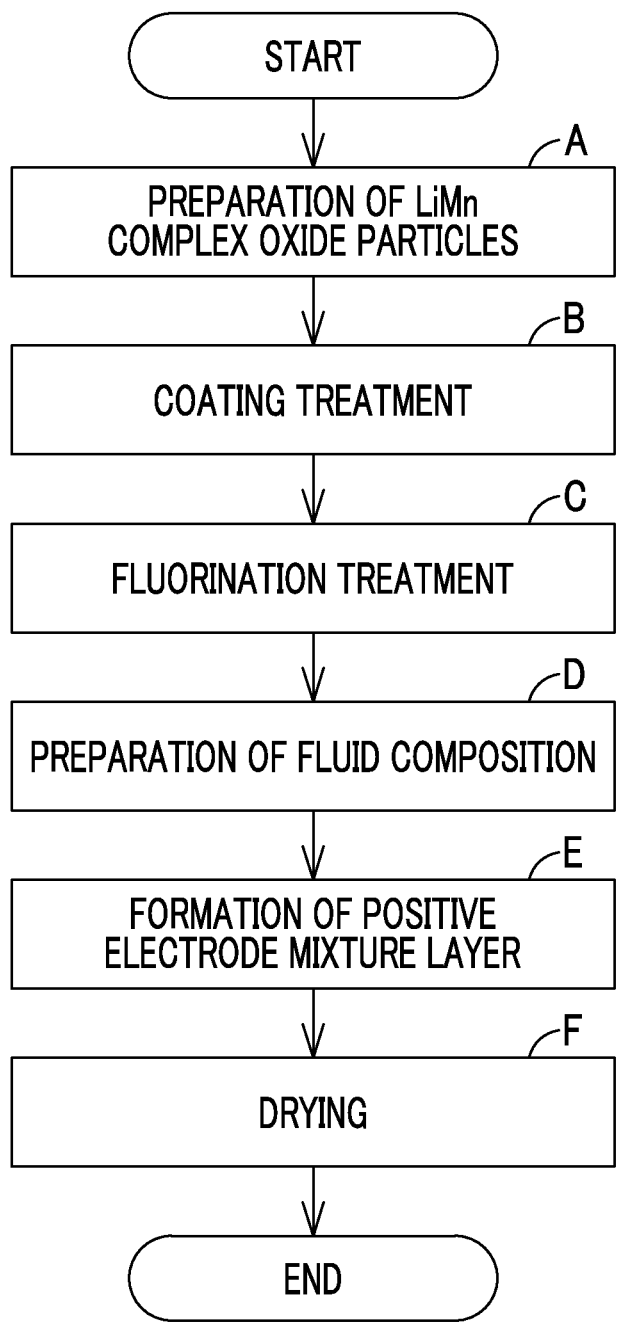
FIG. 1 is a flowchart illustrating an outline of a method for manufacturing a positive electrode for a lithium ion secondary battery of an embodiment of the disclosure.

FIG. 1 is a flowchart illustrating the outline of a method for manufacturing a positive electrode for a lithium ion secondary battery of the embodiment. The manufacturing method of the embodiment includes "(A) the preparation of LiMn complex oxide particles", "(B) a coating treatment", "(C) a fluorination treatment", "(D) the preparation of a fluid composition", "(E) the formation of a positive electrode mixture layer", and "(F) drying". Any one of "(B) the coating treatment" and "(C) the fluorination treatment" may be carried out earlier. Hereinafter, the manufacturing method of the embodiment will be sequentially described.

(A) Preparation of LiMn Complex Oxide Particles

The manufacturing method of the embodiment includes the preparation of LiMn complex oxide particles. Here, the LiMn complex oxide particles may be synthesized or the LiMn complex oxide particles may be purchased. The LiMn complex particles are particles configured of a LiMn complex oxide. The LiMn complex oxide particles are typically secondary particles that are aggregates of primary particles. The secondary particles may have, for example, an average particle diameter of 1 μm to 30 μm, an average particle diameter of 1 μm to 20 μm, and an average particle diameter of 1 μm to 10 μm. The average particle diameter refers to the particle diameter at 50% from the fine particle side in the volume-based cumulative particle size distribution measured using a laser diffraction and scattering method.

The LiMn complex oxide includes lithium (Li), manganese (Mn), and oxygen (O) as indispensable components. The LiMn complex oxide may further include elements other than Li, Mn, and O as long as the LiMn complex oxide includes Li, Mn, and O. Whether or not the LiMn complex oxide includes Li, Mn, and O can be confirmed using, for example, an X-ray fluorescence method (XRF). The composition of the LiMn complex oxide can be specified using, for example, ICP-atomic emission spectroscopy (ICP-AES). The crystal structure of the LiMn complex oxide is not supposed to be particularly limited. The LiMn complex oxide may be, for example, a lamellar rock salt-type oxide, a spinel-type oxide, or an olivine-type oxide.

The LiMn complex oxide may be, for example, an olivine-type oxide such as $LiMnPO_4$ or $LiFe_{0.5}Mn_{0.5}PO_4$; a spinel-type oxide such as $LiMn_2O_4$ or $LiNi_{0.5}Mn_{1.5}O_4$; a lamellar rock salt-type oxide such as $LiNi_{0.8}Co_{0.15}Mn_{0.05}O_2$, $LiNi_{1/3}Co_{1/3}Mn_{1/3}O_2$, $LiNi_{0.4}Co_{0.2}Mn_{0.4}O_2$, $LiNi_{0.4}Co_{0.5}Mn_{0.1}O_2$, $LiNi_{0.5}Mn_{0.5}O_2$, or $LiMnO_2$; or a solid solution such as $Li_2MnO_3$—$LiNiO_2$, $Li_2MnO_3$—$LiNi_{1/3}Co_{1/3}Mn_{1/3}O_2$. The spinel-type oxide such as $LiNi_{0.5}Mn_{1.5}O_4$ is expected as a 5V-class positive electrode material. One kind of LiMn complex oxide may be used singly or two or more kinds of LiMn complex oxides may be used in combination.

It is considered that, in the compositional formula of $LiNi_{0.5}Mn_{1.5}O_4$, as the molar ratio (Mn/Li ratio) of Mn to Li increases, an increase in resistance caused by a change in the valence of Mn is more likely to occur. Therefore, as the Mn/Li ratio increases in the LiMn complex oxide, it is expected that the resistance increase-suppressing effect of the embodiment further intensifies. The Mn/Li ratio of the LiMn complex oxide may be, for example, 0.05 or more, may be 0.1 or more, may be ⅓ (a third) or more, may be 0.5 or more, may be 1.0 or more, and may be 1.5 or more. The Mn/Li ratio of the LiMn complex oxide may be, for example, 2.0 or less.

In the lamellar rock salt-type oxide, it is easier for $Li^+$ to enter and leave between layers, and thus it is considered that an exchange reaction with $H^+$ is more likely to occur. Therefore, even in a case in which the LiMn complex oxide is a lamellar rock salt-type oxide, it is expected that the resistance increase-suppressing effect of the embodiment intensifies.

(B) Coating Treatment

The manufacturing method of the embodiment includes the preparation of coated particles by forming a coating including a $Li^+$-conductive oxide on the surface of each of the LiMn complex oxide particles.

The coating is desirably formed so as to coat the entire surface of the LiMn complex oxide particle. However, there may be surfaces of the LiMn complex oxide particles on which the coating is partially formed as long as the reaction resistance-suppressing effect can be obtained.

The coating is formed so as to have a thickness of 5 nm or more and 10 nm or less. The method for forming the coating is not supposed to be particularly limited as long as coatings having a thickness of 5 nm or more and 10 nm or less can be formed. The coating can be formed using, for example, a physical vapor deposition method (for example, a sputtering method or the like), a chemical vapor deposition method, or a liquid deposition method (for example, a sol-gel method).

In the embodiment, since an assembly (powder) of the LiMn complex oxide particles is treated, a barrel sputtering method is preferred. In the barrel sputtering method, powder is disposed in a barrel. The barrel is, for example, a tubular container. The inside of the barrel is depressurized. In the barrel, for example, an ultrahigh vacuum state ($10^{-5}$ Pa or less) is formed. When the barrel rotates around the central axis as the rotation axis, the powder in the barrel is stirred. The rotation rate of the barrel is set to, for example, approximately 1 rpm to 10 rpm. The barrel may swing like a pendulum from the central axis as the pivot point. The powder is stirred, and a film is formed by sputtering. Therefore, coatings are formed on the surfaces of the respective particles included in the powder, thereby forming coated particles.

The composition of the coating can be adjusted using, for example, the composition of the target, and the flow rate of reactive gas (oxygen). The coating may have a homogeneous composition in all places. The coating may have, for example, a multilayer structure. The coating may have, for example, a composition gradient. The composition of the coating can be measured using scanning transmission electron microscope-energy dispersive X-ray spectroscopy (STEM-EDX).

The coating is formed of a $Li^+$-conductive oxide. That is, the coating includes a $Li^+$-conductive oxide. The $Li^+$-conductive oxide may be at least one oxide selected from the group consisting of a zirconium oxide (for example, $ZrO_2$ or the like), a niobium oxide (for example, $Nb_2O_5$ or the like), and a titanium oxide (for example, $TiO_2$ or the like). The zirconium oxide, the niobium oxide, and the titanium oxide are preferred as the $Li^+$-conductive oxide of the embodiment due to the extremely high $Li^+$-conductivity.

In the present specification, for example, the expression of "zirconium oxide" refers to an oxide including zirconium (Zr) and oxygen as indispensable components. Therefore, the zirconium oxide may further include, for example, metal elements other than Zr such as lanthanum (La). In addition, the expression of "zirconium oxide" or the like indicates all of the well-known compositions in the related art. For example, the "zirconium oxide" indicates not only the stoichiometric composition "$ZrO_2$" but also non-stoichiometric compositions such as "$ZrO_{1.8}$" and "$Zr_{0.8}O_2$".

The thickness of the coating can be adjusted using, for example, the time taken to form the film. The coating is formed so as to have a thickness of 5 nm or more and 10 nm or less. The thickness of the coating is measured by means of the observation of a section of the coated particle (coating). For the observation of a section, STEM is used. In the section processing (the formation of a flake) of the coated particle, focused ion beam (FIB) can be used. The thickness of the coating is measured at three or more places in one coated particle. The arithmetic average of the three places is employed as the thickness of the coating in the coated particle. The same measurement is carried out on three or more coated particles. The arithmetic average of the three or more coated particles is employed as the measurement result.

(C) Fluorination Treatment

The manufacturing method of the embodiment includes the introduction of fluorine into at least a part of the coated particles. Fluorine is introduced into at least a part of the coated particles such that the ratio (F/Mn ratio) of the number of F atoms to the number of Mn atoms reaches 1.95 or more and 3.1 or less in the coated particles.

As described above, the fluorination treatment may be carried out before the coating treatment, may be carried out after the coating treatment, or may be carried out both before and after the coating treatment. That is, fluorine may be introduced into the LiMn complex oxide particles, fluorine may be introduced into the coatings, or fluorine may be introduced into both the LiMn complex oxide particles and the coatings. In any case, fluorine is introduced into at least a part of the coated particles.

Fluorine may be introduced in any form. For example, fluorine may be physically adsorbed onto the LiMn complex oxide particles and the coatings. Chemical bonds may be formed between the LiMn complex oxide particles and the coatings, and fluorine. The presence state of the introduced fluorine is also not supposed to be particularly limited. The introduced fluorine may be in a fluorine atom state, in a fluorine ion state, in a fluorine molecule state, or in a fluorine compound state.

When the LiMn complex oxide particles or the coated particles come into contact with a fluorine-containing substance, fluorine is introduced into at least one of the LiMn complex oxide particles and the coatings. The fluorine-containing substance may be a gas or a liquid. That is, the fluorination treatment may be a gas phase treatment or a liquid phase treatment. A gas phase treatment is preferred since it is easy to uniformly treat the entire powder.

In the gas phase treatment, a fluorine-containing gas is used as the fluorine-containing substance. The fluorine-containing gas is not supposed to be particularly limited. Examples of the fluorine-containing gas include $CF_4$, $SiF_4$, $NF_3$, $C_2F_6$, $C_3F_8$, $SF_6$, $BF_3$, $XeF_2$, $ClF_3$, $CF_3I$, $F_2$, and $BrF_5$. One kind of fluorine-containing gas may be used singly or two or more kinds of fluorine-containing gases may be used in combination. Among the above-described fluorine-containing gases, for example, $NF_3$ has an appropriate reactivity and is thus preferred as the fluorine-containing gas of the embodiment. In order to adjust the reactivity of the fluorine-containing gas (that is, in order to further suppress the generation of LiF or the like), the fluorine-containing gas may be diluted using, for example, inert gas such as nitrogen ($N_2$) or argon (Ar).

For example, a predetermined barrel is prepared. Powder (an assembly of the LiMn complex oxide particles or an assembly of the coated particles) is disposed in the barrel. The inside of the barrel is depressurized. The pressure in the barrel is set to, for example, approximately 0.1 kPa to 10 kPa. When the barrel rotates around the central axis as the rotation axis, the powder in the barrel is stirred. The rotation rate of the barrel is set to, for example, approximately 1 rpm to 10 rpm. The barrel may swing like a pendulum from the central axis as the pivot point. The powder is stirred, and the fluorine-containing gas is introduced into the barrel. Therefore, the respective particles and the fluorine-containing gas come into contact with each other, and fluorine is introduced into the respective particles. The fluorine-containing gas may be turned into plasma. It is considered that the generation of atom-like fluorine further facilitates fluorine to be chemically bonded to at least a part of the LiMn complex oxide particles and the coatings. In order to turn the fluorine-containing gas into plasma, for example, an atmospheric plasma apparatus, or a vacuum plasma apparatus can be used.

The fluorination treatment is carried out such that the F/Mn ratio reaches 1.95 or more and 3.1 or less. The F/Mn ratio can be adjusted using the treatment time, the kind of the fluorine-containing gas, the dilution factor of the fluorine-containing gas, or the like. The F/Mn ratio of the LiMn complex oxide particles or the coated particles is measured using X-ray photoelectron spectroscopy (XPS). The F/Mn ratio is measured three or more times for one powder specimen. The arithmetic average of three or more measurements is employed as the measurement result.

(D) Preparation of Fluid Composition

The manufacturing method of the embodiment includes the preparation of a fluid composition by mixing the coated particles at least a part of which fluorine is introduced into, a conductive material, an aqueous binder, and an aqueous solvent.

The fluid composition is a precursor of the positive electrode mixture layer described below. The fluid composition is prepared by mixing the coated particles, a conductive material, an aqueous binder, and an aqueous solvent in a predetermined mass ratio. In the mixing, an ordinary stirring and mixing apparatus can be used. The rotation rate of stirring blades is set to, for example, approximately 2,000 rpm to 4,000 rpm. The mixing time is appropriately adjusted depending on powder properties, the treatment amount, or the like.

The coated particles may be blended so as to have a mass fraction of, for example, 80% by mass to 98% by mass of the solid content. The detail of the material configuring the coated particles is as described above.

The conductive material is not supposed to be particularly limited. The conductive material may be, for example, acetylene black, thermal black, furnace black, vapor grown carbon fiber (VGCF), or graphite. One kind of conductive material may be used singly or two or more kinds of conductive materials may be used in combination. The conductive material may be blended so as to have a mass fraction of, for example, 1% by mass to 15% by mass of the solid content.

The aqueous binder refers to a binder that can be dissolved in aqueous solvents or dispersed in aqueous solvents. The aqueous binder may be, for example, polyacrylic acid (PAA), carboxymethyl cellulose (CMC), polytetrafluoroethylene (PTFE), polyvinyl alcohol (PVA), polyvinyl butyral (PVB), an acrylic acid ester copolymer, or alginic acid. One kind of aqueous binder may be used singly or two or more kinds of aqueous binders may be used in combination. The aqueous binder may be blended so as to have a mass fraction of, for example, 0.5% by mass to 5% by mass of the solid content.

In a case in which the fluid composition is wet granules, an aqueous binder that absorbs an aqueous solvent and thus gelatinizes may be used. When the aqueous binder absorbs an aqueous solvent, the additional suppression of the contact between the LiMn complex oxide particles and water is expected. The aqueous binder may be gelatinized by being brought into contact with water in advance before being mixed. Examples of the aqueous binder that gelatinizes include crosslinking-type polyacrylic acids. The degree of crosslinking (also referred to as "gel fraction") may be, for example, approximately 20% by mass to 80% by mass. The degree of crosslinking is computed as described below. That is, a specimen is extracted using xylene. The portion that remains without being extracted is a portion to be gelatinized. The mass fraction of the gel portion in the mass of the specimen before extraction is the degree of crosslinking.

The aqueous solvent refers to water (pure water) or a solvent mixture of an organic solvent that mixes with water and water. Examples of the organic solvent that mixes with water include lower alcohols such as methanol, ethanol, and isopropyl alcohol; ketones such as acetone; ethers such as 1,3-dioxolan and tetrahydrofuran. Due to the ease of handling, the aqueous solvent is preferably water.

The fluid composition may be prepared into a paste (particle dispersion liquid), prepared into a clay-like composition, or prepared into wet granules as long as the fluid composition is fluid. Even when the fluid composition is a paste, it is considered that, due to the combined action of the coatings and fluorine, the resistance increase-suppressing effect can be obtained. From the viewpoint of further suppressing the contact between the LiMn complex oxide particles and water, the fluid composition is preferably wet granules.

Whether the fluid composition is prepared into a paste, a clay-like composition, or wet granules can be adjusted using the solid content fraction (that is, the amount of the aqueous solvent used) of the fluid composition. As criteria, in a case in which the solid content fraction of the fluid composition is less than 60% by mass, there is a tendency that the fluid composition is likely to become a paste. In a case in which the solid content fraction of the fluid composition is 60% by mass or more and 70% by mass or less, there is a tendency that the fluid composition is likely to become a clay-like composition. In a case in which the solid content fraction of the fluid composition is 70% by mass or more and less than 100% by mass, there is a tendency that the fluid composition is likely to become wet granules. From the viewpoint of the balance between fluidity and the amount of the solvent, the solid content fraction of wet granules is preferably 75% by mass or more and 80% by mass or less.

The fluid composition may be prepared so as to further include, in addition to the above-described components, a variety of additives and the like. Examples of the additives include lithium phosphate ($Li_3PO_4$) that forms coatings during charging and discharging.

The pH of the fluid composition may be adjusted. In the adjusting of the pH of the fluid composition, for example, a weak acid such as $H_3PO_4$ and a weak base such as $Li_2CO_3$ can be used. It is considered that, when the pH of the fluid composition is adjusted to be more basic, the amount of $H^+$ decreases, and the exchange reaction between $Li^+$ and $H^+$ is further suppressed. However, in a case in which the collector described below is an aluminum (Al) foil, when the fluid composition is basic, the Al foil is corroded, and there is a possibility that the electron conductivity of the Al foil may be impaired. In the embodiment, it is considered that, even when a certain amount of $H^+$ is present, due to the combined action of the coatings and fluorine, the exchange reaction between $Li^+$ and $H^+$ is further suppressed. Therefore, in the embodiment, the pH of the fluid composition can be adjusted such that the corrosion of the Al foil is further suppressed, and furthermore, the exchange reaction between $Li^+$ and $H^+$ is further suppressed. The pH of the fluid composition can be adjusted to, for example, approximately 7 to 11. The pH of the fluid composition can be measured using an ordinary pH meter.

(E) Formation of Positive Electrode Mixture Layer

The manufacturing method of the embodiment includes the formation of the positive electrode mixture layer by disposing the fluid composition on the surface of the collector.

The collector is typically an Al foil. The Al foil may be a pure Al foil or an Al alloy foil. The thickness of the collector may be, for example, 10 μm to 30 μm.

The method for disposing the fluid composition on the surface of the collector is not supposed to be particularly limited. In a case in which the fluid composition is a paste, the paste can be disposed on the surface of the collector using, for example, a die coater. In a case in which the fluid composition is a clay-like composition, the clay-like composition can be disposed on the surface of the collector using, for example, a knife coater.

Figure 2:
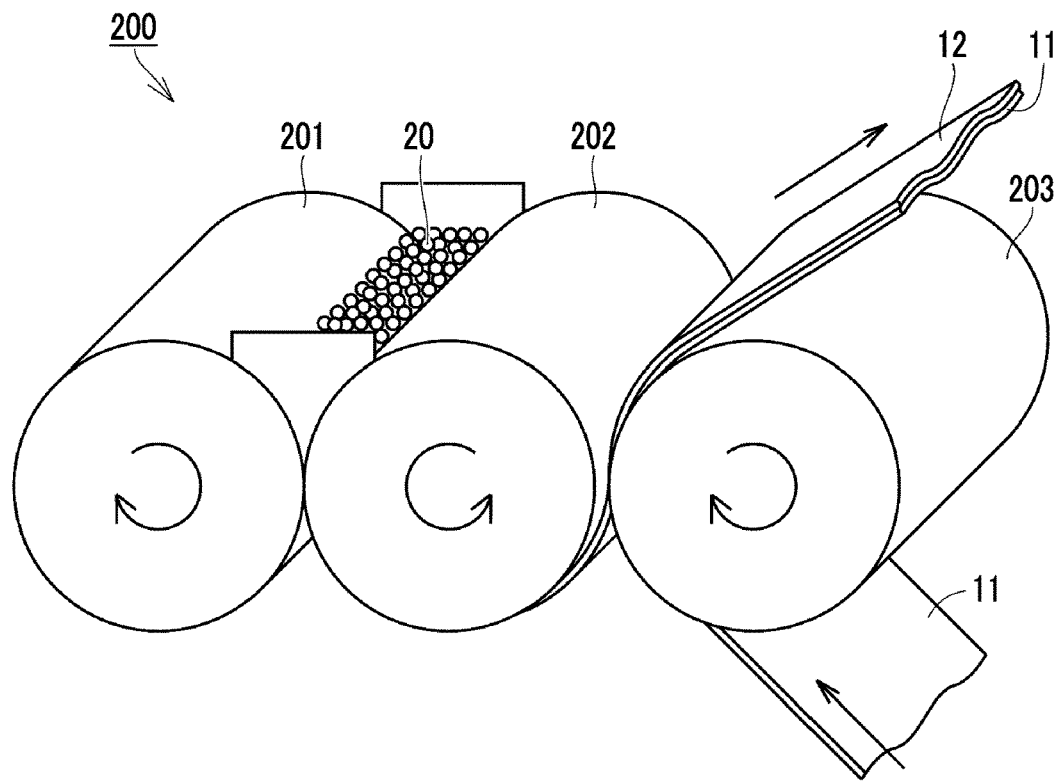
FIG. 2 is a schematic view illustrating an example of a configuration of a roll coater.

In a case in which the fluid composition is wet granules, for example, a roll coater illustrated in FIG. 2 can be used. FIG. 2 is a schematic view illustrating an example of the configuration of the roll coater. In a case in which a roll coater 200 is used, "(e1) roll shaping" and "(e2) roll transfer" described below are carried out. That is, "(E) the formation of the positive electrode mixture layer" includes "(e1) roll shaping" and "(e2) roll transfer".

The roll coater 200 is configured of three rotating rolls. That is, the roll coater 200 includes a first rolling roll 201, a second rolling roll 202, and a third rolling roll 203. Curved arrows drawn in the respective rolling rolls indicate the rolling directions of the respective rolling rolls. The first rolling roll 201, the second rolling roll 202, and the third rolling roll 203 are disposed such that the rotation axes become parallel to one another. The second rolling roll 202 rotates at, for example, a faster circumferential rate than the first rolling roll 201. The third rolling roll 203 rotates at, for example, a faster circumferential rate than the second rolling roll 202.

(e1) Roll Shaping

Wet granules 20 are supplied to a roll gap between the first rolling roll 201 and the second rolling roll 202. In the roll gap, the wet granules 20 are formed into a lamellar shape. That is, the wet granules 20 are rolled into a lamellar shape by the roll shaping.

(e2) Roll Transfer

The second rolling roll 202 transfers the wet granules 20 shaped into a lamellar shape to a roll gap between the second rolling roll 202 and the third rolling roll 203. The third rolling roll 203 supplies a collector 11 to the roll gap between the second rolling roll 202 and the third rolling roll 203. In the roll gap, the wet granules 20 shaped to a lamellar shape are rubbed by the surface of the collector 11. Therefore, the wet granules 20 shaped to a lamellar shape are transferred to the surface of the collector 11. That is, the wet granules 20 shaped to a lamellar shape are disposed on the surface of the collector 11 by roll transfer. Therefore, a positive electrode mixture layer 12 is formed. The positive electrode mixture layer 12 may be formed on both surfaces of the collector 11.

(F) Drying

The manufacturing method of the embodiment includes the manufacturing of a positive electrode by drying the positive electrode mixture layer.

For example, the positive electrode mixture layer is dried using a hot-air drying furnace or an infrared drying furnace. The positive electrode mixture layer may also be naturally dried. In a case in which the fluid composition that is the precursor of the positive electrode mixture layer is wet granules, for example, reduction of the drying costs and shortening of the drying time are expected. This is because the amount of the solvent is relatively small. When the positive electrode mixture layer is dried, a positive electrode is completed. After that, the positive electrode may be rolled into a predetermined thickness or the positive electrode may be cut into a predetermined shape (for example, a stripe shape or a rectangular shape) according to the specification of lithium ion secondary batteries.

Positive Electrode for Lithium Ion Secondary Battery

Hereinafter, a positive electrode for a lithium ion secondary battery manufactured using the above-described manufacturing method will be described. In a positive electrode for a lithium ion secondary battery of the embodiment, the contact between the LiMn complex oxide particles and water is further suppressed in manufacturing processes, and thus a lower reaction resistance is expected.

Figure 3:
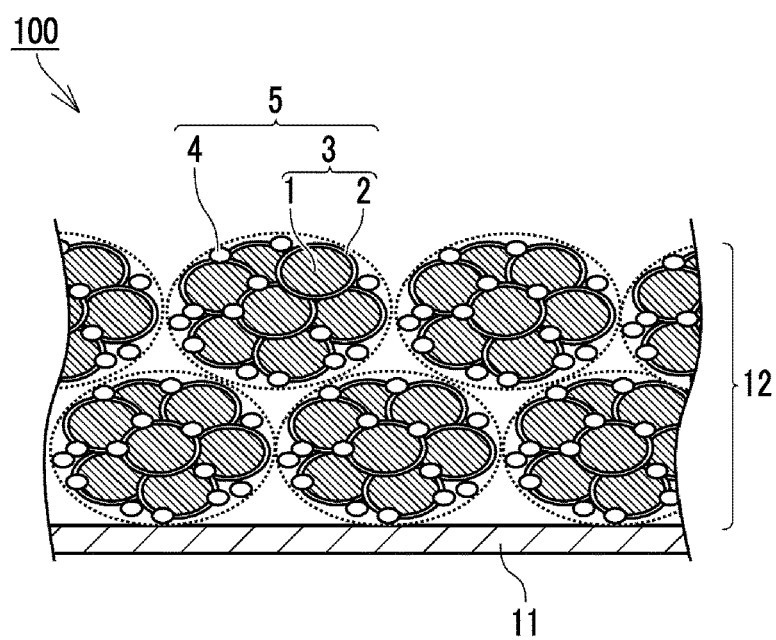
FIG. 3 is a schematic sectional view illustrating an example of a configuration of a positive electrode for a lithium ion secondary battery of an embodiment of the disclosure.

FIG. 3 is a schematic sectional view illustrating an example of the configuration of the positive electrode for a lithium ion secondary battery of the embodiment of the disclosure. A positive electrode 100 includes the collector 11 and the positive electrode mixture layer 12. The positive electrode mixture layer 12 is disposed on the surface of the collector 11. The thickness of the positive electrode mixture layer 12 may be, for example, 10 μm to 100 μm.

The positive electrode mixture layer 12 includes coated particles 3, a conductive material 4, and an aqueous binder (not illustrated). For example, the positive electrode mixture layer 12 includes 80% by mass to 98% by mass of the coated particles 3, 1% by mass to 15% by mass of the conductive material 4, and 1% by mass to 5% by mass of the aqueous binder. The details of the conductive material and the aqueous binder are as described above.

The coated particle 3 includes a LiMn complex oxide particle 1 and a coating 2. The coating 2 includes a $Li^+$-conductive oxide. As described above, the $Li^+$-conductive oxide may be at least one oxide selected from the group consisting of a zirconium oxide, a niobium oxide, and a titanium oxide. The thickness of the coating 2 is 5 nm or more and 10 nm or less.

The coated particle 3 further includes fluorine. Fluorine is included in at least a part of the coated particle 3 (that is at least one of the LiMn complex oxide particle 1 and the coating 2). In the coated particles 3, the F/Mn ratio is 1.95 or more and 3.1 or less.

In a case in which the fluid composition that is the precursor of the positive electrode mixture layer 12 is the wet granules 20, the positive electrode mixture layer 12 is configured of granules 5. That is, the positive electrode mixture layer 12 may include the granules 5. In a case in which the positive electrode mixture layer 12 is configured of the granules 5, when the positive electrode mixture layer 12 is observed using an optical microscope or the like, it is confirmed that the granules 5 are in a state of being placed below in a stone wall shape.

The granules 5 are aggregates of particles. The granules 5 respectively include the coated particles 3, the conductive material 4, and the aqueous binder. The granules 5 are formed of a plurality of the coated particles 3 and the conductive material 4 being bonded to each other through the aqueous binder. The shape of the granule 5 is not supposed to be particularly limited. The granules 5 may have a massive shape, a substantially spherical shape, or the like. The granules 5 may have an oblate shape due to the influence of the roll shaping, the roll transfer, rolling, and the like.

Hereinafter, examples will be described. However, the following examples do not limit the scope of the disclosure.

Example 1 (A) Preparation of LiMn Complex Oxide Particles

As LiMn complex oxide particles, $LiNi_{0.5}Mn_{1.5}O_4$ (average particle diameter: 8 μm) was prepared.

(C) Fluorination Treatment

The LiMn complex oxide particles were disposed in a predetermined barrel. The inside of the barrel was depressurized. The pressure in the barrel was set to 1 kPa. The barrel was swung like a pendulum from the central axis as the pivot point, whereby the LiMn complex oxide particles (powder) were stirred, and a gas mixture of $NF_3$ and Ar was introduced into the barrel. The concentration of $NF_3$ in the gas mixture was set to 15 ppm. Therefore, fluorine was introduced into the LiMn complex oxide particles (that is, at least a part of coated particles described below). The treatment time was set to 30 minutes. After the fluorination treatment, the F/Mn ratio was measured using XPS. The results are shown in Table 1.

(B) Coating Treatment

The fluorinated LiMn complex oxide particles were disposed in a barrel of a barrel sputtering apparatus. The inside of the barrel was depressurized. Zr was set as a target metal. As a reactive gas, oxygen ($O_2$) was introduced into the barrel. The barrel was swung like a pendulum from the central axis as the pivot point, whereby the LiMn complex oxide particles were stirred, and a high-frequency output was applied between the target metal and the barrel. Therefore, a zirconium oxide was deposited on the surfaces of the LiMn complex oxide particles. That is, coatings including the zirconium oxide ($Li^+$-conductive oxide) were formed on the surfaces of the LiMn complex oxide particles, thereby preparing coated particles. The thickness of the coating was measured using STEM. The results are shown in Table 1.

(D) Preparation of Fluid Composition

The following materials were prepared: a conductive material: acetylene black ("DENKA BLACK HS-100" manufactured by Denka Company Limited) an aqueous binder: crosslinking-type polyacrylic acid (the degree of crosslinking: 60% by mass) an aqueous solvent: ion exchange water additive: $Li_3PO_4$ pH adjuster: $H_3PO_4$.

The coated particles, the conductive material, the aqueous binder, and the aqueous solvent were injected into a stirring tank of a stirring and mixing apparatus. The contents in the stirring tank were stirred and mixed together at a rotation rate of 3,000 rpm. Therefore, wet granules that were a fluid composition were prepared (granulated). The solid content composition was set to "the coated particles:the conductive material:the aqueous binder:the additive=90:5:2.2:2.8". The solid content fraction of the wet granules was set to 77% by mass. The pH of the wet granules was adjusted to 10.5.

(E) Formation of Positive Electrode Mixture Layer

As a collector, an Al foil (thickness: 15 μm) was prepared. The wet granules and the collector were supplied using a roll coater. The wet granules were formed into a lamellar shape by roll shaping. The wet granules shaped into a lamellar shape were disposed on the surface of the collector by roll transfer. Therefore, a positive electrode mixture layer was formed.

(F) Drying

The positive electrode mixture layer was dried using a hot-air drying furnace set to 140° C. Therefore, a positive electrode was manufactured.

Manufacturing of Lithium Ion Secondary Battery

The positive electrode was rolled into a predetermined thickness. The positive electrode was cut to predetermined dimensions. A negative electrode and a separator were prepared. The positive electrode and the negative electrode were laminated together with the separator inserted therebetween. Therefore, an electrode group was configured. An exterior body configured of an Al laminate film was prepared. The electrode group was inserted into the exterior body. An electrolytic solution was prepared. The electrolytic solution was poured into the exterior body. The exterior body was sealed. Therefore, a lithium ion secondary battery (laminate battery) including the positive electrode, the negative electrode, the separator, and the electrolytic solution was manufactured. In the laminate battery, the configuration of portions other than the positive electrode was set as described below.

Negative Electrode

Negative electrode active material: graphite binder: CMC and styrene butadiene rubber (SBR) solid content composition: [graphite:CMC:SBR=98:1:1 (mass ratio)] collector: copper foil (thickness: 8 μm) (separator) polyethylene porous film (thickness: 20 μm) (electrolytic solution) supporting electrolyte salt: $LiPF_6$ (1.0 mol/l) solvent: [EC:DMC:EMC=3:4:3 (volume ratio)]

"EC" represents ethylene carbonate, "DMC" represents dimethyl carbonate, and "EMC" represents ethyl methyl carbonate.

Examples 2 to 4 and Comparative Examples 1 to 15

Positive electrodes and lithium ion secondary batteries were manufactured using the same manufacturing method as in Example 1 except the fact that the conditions of the fluorination treatment and the coating treatment were changed so as to obtain the "F/Mn ratios" and the "thicknesses of the coating" shown in Table 1.

Evaluation

The laminate battery was charged to 4.75 V at a current rate of 0.3 C. Therefore, the laminate battery was activated. "1C" indicates a current rate at which the full charging capacity of the battery can be charged or discharged in one hour.

The state of charge (SOC) of the laminate battery was adjusted to 60%. In an environment of 25° C., the impedance of the positive electrode was measured using an alternating-current impedance method. The impedance was plotted on a complex plane. The width (diameter) of the actual number component of the drawn arc was considered as reaction resistance. The results are shown in the "reaction resistance" column of Table 1. Numerical values shown in the same column are values obtained by dividing the reaction resistance of each example by the reaction resistance of Comparative Example 1.

TABLE 1

Compendium of Examples and Comparative Examples

| | (C) Fluorination treatment F/Mn ratio — | (B Coating treatment Thickness of coating nm | Reaction resistance — |
|---|---|---|---|
| Comparative Example 1 | 0 | 0 | 1 |
| Comparative Example 2 | 1.95 | 0 | 0.99 |
| Comparative Example 3 | 3.1 | 0 | 0.98 |
| Comparative Example 4 | 4.1 | 0 | 1.01 |
| Comparative Example 5 | 0 | 5 | 1 |
| Comparative Example 6 | 0 | 10 | 0.97 |
| Comparative Example 7 | 0 | 20 | 1.24 |
| Example 1 | 1.95 | 5 | 0.95 |
| Example 2 | 1.95 | 10 | 0.93 |
| Example 3 | 3.1 | 5 | 0.94 |
| Example 4 | 3.1 | 10 | 0.93 |
| Comparative Example 8 | 0 | 14 | 0.98 |
| Comparative Example 9 | 0 | 17 | 1.02 |
| Comparative Example 10 | 0 | 19 | 1.1 |
| Comparative Example 11 | 1.95 | 14 | 0.99 |
| Comparative Example 12 | 1.95 | 17 | 1.03 |
| Comparative Example 13 | 3.1 | 14 | 0.99 |
| Comparative Example 14 | 3.1 | 17 | 1.05 |
| Comparative Example 15 | 0.52 | 0 | 0.999 |

Results

Figure 4:
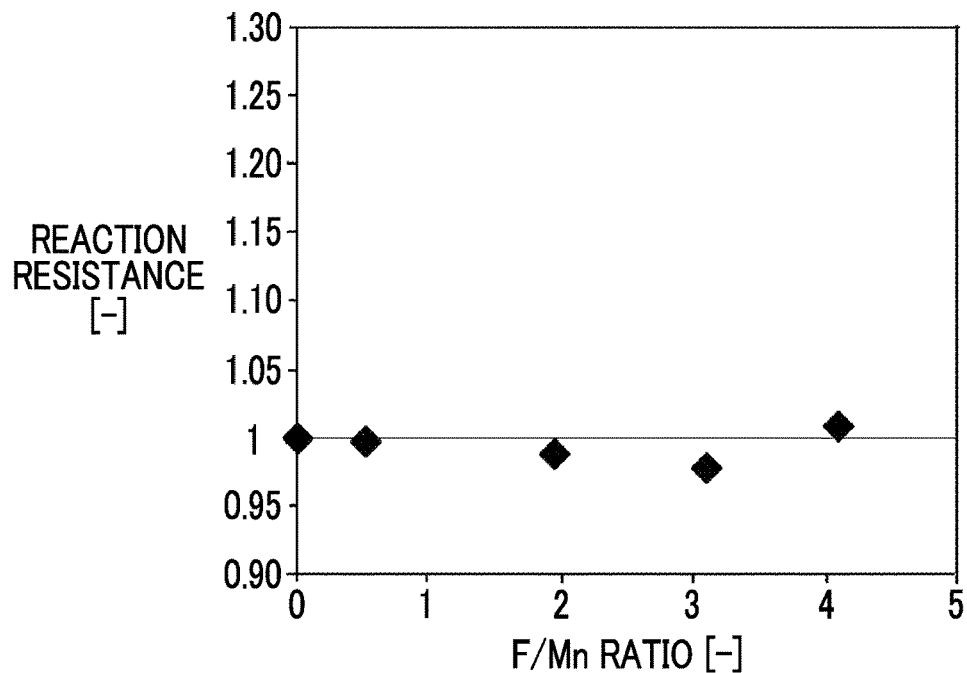
FIG. 4 is a graph illustrating a relationship between an F/Mn ratio and reaction resistance.

FIG. 4 is a graph illustrating the relationship between the F/Mn ratio and the reaction resistance. FIG. 4 illustrates the results of Comparative Examples 1 to 4 and 15. In Comparative Examples 1 to 4 and 15, the coating treatment was not carried out. As illustrated in FIG. 4, the fluorination treatment alone rarely produces the resistance increase-suppressing effect. In addition, when the F/Mn ratio is more than 3.1, the reaction resistance, conversely, increases.

Figure 5:
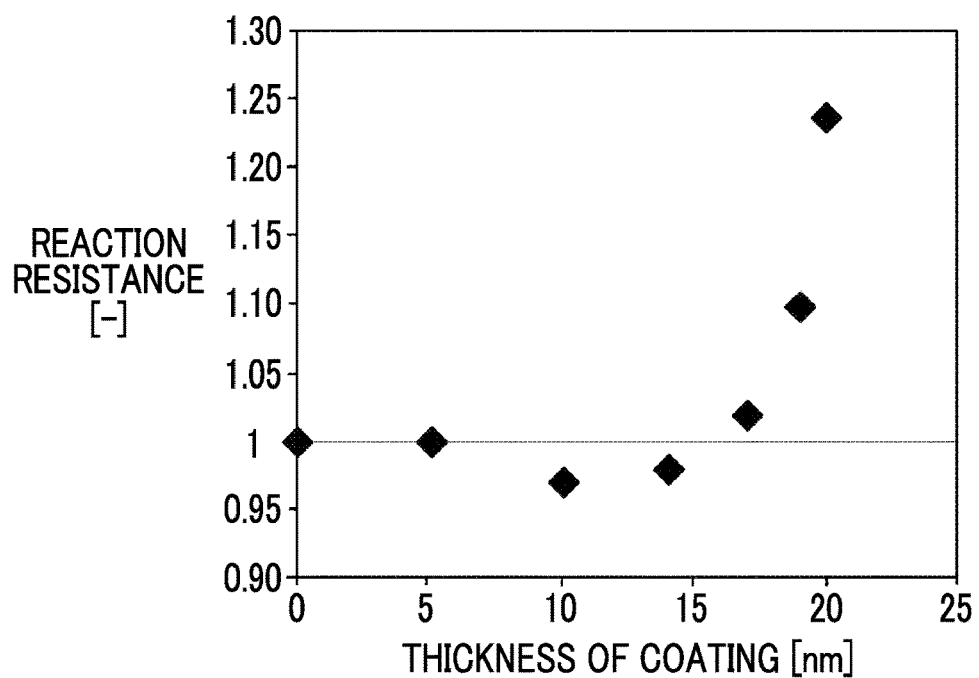
FIG. 5 is a graph illustrating a relationship between a thickness of a coating and the reaction resistance.

FIG. 5 is a graph illustrating the relationship between the thickness of the coating and the reaction resistance. FIG. 5 illustrates the results of Comparative Examples 1 and 5 to 10. In Comparative Examples 1 and 5 to 10, the fluorination treatment was not carried out. As illustrated in FIG. 5, in order to obtain the resistance increase-suppressing effect by the coating treatment alone, a thickness of 10 nm or more is needed. When the thickness of the coating is more than 14 nm, the reaction resistance, conversely, increases.

Figure 6:
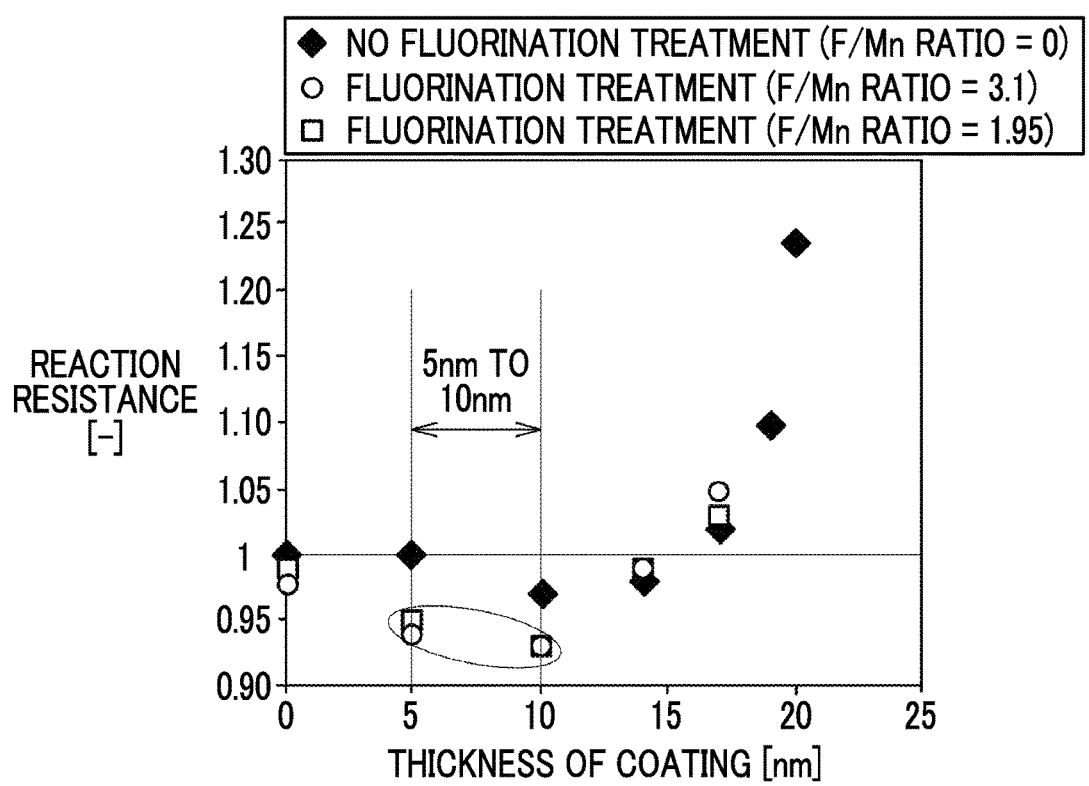
FIG. 6 is a graph illustrating a relationship among the F/Mn ratio, the thickness of the coating, and the reaction resistance.

FIG. 6 is a graph illustrating the relationship among the F/Mn ratio, the thickness of the coating, and the reaction resistance. FIG. 6 illustrates the results except Comparative Examples 4 and 15. For example, based on the results of Comparative Example 2 and Comparative Example 5, the reaction resistance in Example 1 is expected to reach approximately 0.99 to 1. However, in Example 1, the increase in the reaction resistance is significantly suppressed beyond the scope of the above-described expectation. This is considered to be attributed to the combined action of fluorine and the coatings. As illustrated in FIG. 6, in a case in which the F/Mn ratio is 1.95 or more and 3.1 or less, and the thickness of the coating is 5 nm or more and 10 nm or less, the resistance increase-suppressing effect is significant.

The embodiment and the examples are simply examples in all aspects and are not supposed to be considered as restrictive. The scope of the disclosure is determined by the claims, not the above description, and is intended to include all modifications within the equivalent meaning and scope to the scope of the claim.

What is claimed is:

1. A method for manufacturing a positive electrode for a lithium ion secondary battery, the method comprising:
   preparing lithium manganese complex oxide particles;
   preparing coated particles by forming a coating including a lithium ion-conductive oxide on a surface of each of the lithium manganese complex oxide particles;
   introducing fluorine into at least a part of the coated particles;
   preparing a fluid composition by mixing the coated particles at least a part of which fluorine is introduced into, a conductive material, an aqueous binder, and an aqueous solvent;
   forming a positive electrode mixture layer by disposing the fluid composition on a surface of a collector; and
   drying the positive electrode mixture layer, wherein:
   the coating is formed so as to have a thickness of 5 nm or more and 10 nm or less; and
   fluorine is introduced into at least a part of the coated particles such that a ratio of the number of fluorine atoms to the number of manganese atoms in the coated particles reaches 1.95 or more and 3.1 or less.

2. The method according to claim 1, wherein the lithium ion-conductive oxide is at least one oxide selected from the group consisting of a zirconium oxide, a niobium oxide, and a titanium oxide.

3. The method according to claim 1, wherein a solid content fraction of the fluid composition is 70% by mass or more and less than 100% by mass.

4. The method according to claim 1, wherein the fluid composition is wet granules.

5. The method according to claim 4, wherein the forming of the positive electrode mixture layer includes formation of the wet granules in a lamellar shape by roll shaping and disposition of the wet granules shaped in a lamellar shape by roll transfer on the surface of the collector.

6. A positive electrode for a lithium ion secondary battery, the positive electrode comprising:
   a collector; and
   a positive electrode mixture layer, wherein:
   the positive electrode mixture layer is disposed on a surface of the collector;
   the positive electrode mixture layer includes coated particles, a conductive material, and an aqueous binder;
   the coated particle includes a lithium manganese complex oxide particle and a coating;
   the coating coats a surface of the lithium manganese complex oxide particle;
   the coating includes a lithium ion-conductive oxide;
   a thickness of the coating is 5 nm or more and 10 nm or less;
   the coated particle further includes fluorine; and
   a ratio of the number of fluorine atoms to the number of manganese atoms in the coated particles is 1.95 or more and 3.1 or less.

7. The positive electrode according to claim 6, wherein the lithium ion-conductive oxide is at least one oxide selected from the group consisting of a zirconium oxide, a niobium oxide, and a titanium oxide.

8. The positive electrode according to claim 6, wherein:
   the positive electrode mixture layer includes granules; and
   the granules include the coated particles, the conductive material, and the aqueous binder.

* * * * *